Sept. 23, 1958  J. P. PACA ET AL  2,853,355
INSULATED CABINET CONSTRUCTION
Filed July 22, 1955  8 Sheets-Sheet 1

INVENTORS
John P. Paca
BY Carl D. Graber

Frease & Bishop
ATTORNEYS

Sept. 23, 1958  J. P. PACA ET AL  2,853,355
INSULATED CABINET CONSTRUCTION
Filed July 22, 1955  8 Sheets-Sheet 2

INVENTORS
John P. Paca and
BY Carl D. Graber

Frease & Bishop
ATTORNEYS

Sept. 23, 1958  J. P. PACA ET AL  2,853,355
INSULATED CABINET CONSTRUCTION
Filed July 22, 1955  8 Sheets-Sheet 3

Fig. 5

INVENTORS
John P. Paca and
BY Carl D. Graber
Frease & Bishop
ATTORNEYS

Sept. 23, 1958        J. P. PACA ET AL        2,853,355

INSULATED CABINET CONSTRUCTION

Filed July 22, 1955                                  8 Sheets-Sheet 7

INVENTORS
John P. Paca and
BY   Carl D. Graber

Frease & Bishop

ATTORNEYS

United States Patent Office 2,853,355
Patented Sept. 23, 1958

2,853,355

INSULATED CABINET CONSTRUCTION

John P. Paca, Canton, and Carl D. Graber, Orrville, Ohio, assignors to Diebold, Incorporated, Canton, Ohio, a corporation of Ohio Application July 22, 1955, Serial No. 523,685

5 Claims. (Cl. 312—311)

The invention or discovery relates to insulated cabinet construction in which a cabinet unit includes insulated top, back, end, and bottom walls forming a cabinet compartment having a front door frame engirdling a front opening of the compartment, and in which a door is hinge mounted on a carriage located below the cabinet bottom and operatively mounted for reciprocation to retract and extend the door in a horizontal position from and to a forward position of the carriage at which the door may be swung to and from a closing position in the door frame, and in which counterbalancing means are interposed between the carriage and the door.

The invention or discovery furthermore relates to such a cabinet in which the compartment has an interior volume of substantial magnitude, and in which the compartment contains interior equipment filling its entire volume, such as cycle billing filing equipment, and in which it is desired to have a maximum number of cards or other records within reach of and workable by a seated operator.

Prior to the present invention or discovery, cycle billing filing equipment has frequently been housed in cabinets without insulation against fire and heat.

From another standpoint, insulated cabinet units having disappearing or partially disappearing doors have required an excessive space for the door mounting and counter-balancing means. Where a large number of such insulated cabinet units are installed in side by side abutment, as in an office handling many thousands of records, such excessive space is undesirable.

The objects of the present invention or discovery include the provision of insulated filing cabinet construction embodied in a unit having a door which, after opening to a horizontal position, is movable to a position where the door is partially or entirely below the cabinet bottom wall, and in which reciprocating carriage and counter-balancing means hinge mount and provide easy swinging of the door, and in which the reciprocating carriage and counter-balancing means are of improved and simplified and compact construction.

Further objects of the present invention or discovery include the provision of such an improved insulated cabinet unit including interior equipment of the cycle billing filing type, and in which the interior equipment is of improved and simplified construction and arrangement enabling a large number of records to be reached and worked by a seated operator.

The foregoing and other objects are attained by the insulated cabinet construction, parts, combinations, and subcombinations, which comprise the present invention or discovery, the nature of which is set forth in the following general statement, and preferred embodiments of which, together with their mode of use, are set forth by way of example in the following description, and which are particularly and distinctly pointed out and set forth in the appended claims forming part hereof.

The unique and characterizing nature of the improved insulated cabinet construction of the present invention or discovery may be stated in general terms as constituting a cabinet unit including insulated top, back, end, and bottom walls forming a cabinet compartment having a front opening, a door frame engirdling the front opening, a carriage operatively mounted for reciprocation below the insulated bottom wall, the carriage reciprocating from and to a front position adjacent the front plane of the door frame, a door, hinge means mounting the door on the carriage, the door being swingable when the carriage is in the front position between a closed position in the door frame and an open position below the bottom plane of and substantially parallel with the cabinet bottom wall, whereby the door may move with the carriage from the front position of the carriage to a rear position in which the door is partially or entirely overlapped by the cabinet bottom wall.

Improved counter-balancing means are operatively interposed between the door and the carriage, the counter-balancing means being associated with the hinge means, and the counter-balancing hinge means including longitudinally spaced laterally extending plate members on the carriage, hinge straps exteding laterally from the door towards the carriage, the hinge straps being longitudinally spaced from each other, and each hinge strap being located preferably midway between two of the carriage plate members, a collar on each hinge strap, the plate members having formed therein openings aligned with each other, the collars having bores aligned with each other and with the plate openings, a spacer tube located between one side face of each collar and the opposite side face of one of the plate members, the spacer tubes having bores aligned with each other, a shaft extending through the aligned bores and apertures, a helical tube wound around each spacer tube, each spring having terminals and one terminal reacting against the door and the other terminal reacting against the carriage, the springs on opposite sides of each collar being wound in opposite directions whereby a plurality of longitudinally spaced counter-balancing spring pressures react between the door and the carriage.

The improved cabinet unit also has improved interior equipment separably mounted in the compartment, the interior equipment including an end plate adjacent each cabinet end wall, a plurality of pans mounted for reciprocation on the end plates, a plurality of trays mounted for reciprocation on each pan, and a plurality of shelves mounted for reciprocation on each pan.

By way of example, embodiments of the improved insulated cabinet construction and parts thereof, of the present invention or discovery are illustrated in the accompanying drawings forming part hereof, in which.

Similar numerals refer to similar parts throughout the several views of the drawings.

In Figs. 1 to 16, there is illustrated an insulated cabinet unit indicated generally by 20 and which includes a lower supporting table indicated generally by 21.

The table 21 may be of any desired construction, and as shown includes four upright legs 22 forming the vertical corners of the table, each table leg having a leveling screw foot 23 at its lower end, the screw feet 23 adjustably supporting the unit 20 on the floor of the room in which the unit is located.

Spaced above the lower ends of the legs 22, lower reinforcing end frame members 24 and 25 and lower reinforcing longitudinal frame members 26 and 27 extend between and have their ends connected with the legs 22.

Spaced above the lower frame members 24, 25, 26, and 27, upper end frame members 28 and 29 and upper longitudinal frame members 30 and 31 extend between and connect the upper ends of the table legs 22, the frame members 28, 29, 30, and 31 being angle bars as shown, and having respectively top flanges 28–1, 29–1, 30–1, and 31–1 with upper faces in the same plane.

The table 21 furthermore includes a top housing indicated generally by 32, and including a rectangular top wall 33 from the rear edge of which a back wall 34 extends downwardly, and from the end edges of which end walls 35 and 36 extend downwardly.

The housing top wall 33 is spaced above the angle bar top flanges 28–1, 29–1, 30–1, and 31–1, and the housing back wall 34 and end walls 35 and 36 have a tele- scoped abutment respectively with the side flanges 31–2, 28–2, and 29–2 of the angle bars 31, 28, and 29, and the housing back and end walls are connected to the angle bar side flanges, as by welding.

The table top housing 32 and the angle bars 28, 29, 30, and 31 thus form a compartment 37 having a front opening 38 bounded by the front ends of the housing top wall 33 and end walls 35 and 36 and the angle bar top flange 30–1.

Seated on the top face of the top bar 33 of the housing 32, there is located and connected to the top wall 33, a composite insulated bottom wall 39; and from the outer borders of the composite insulated bottom wall 39 there extend upwardly a composite insulated back wall 40, and composite insulated end walls 41 and 42. A composite insulated top wall 43 extends across the upper end borders of the back wall 40 and end walls 41 and 42. All of the composite insulated walls are corner connected with each other in the usual manner, and form an insulated cabinet compartment 44 having a front opening 45 which is engirdled by a grooved and flanged door frame 46 which is made in a usual manner of formed sheet metal.

Each of the composite insulated walls 39, 40, 41, 42, and 43 includes an outer sheet metal wall constituting a part of an outer sheet metal shell S–1; and each of the composite walls includes an inner sheet metal wall spaced from its outer sheet metal wall and constituting a part of an inner sheet metal shell S–2. The front ends of the inner and outer sheet metal walls of the composite bottom wall 39 and end walls 41 and 42 and top wall 43 are connected in a usual manner with the grooved and flanged sheet metal door frame 46. The space between the inner and outer sheet metal shells S–1 and S–2 is filled in a usual manner with insulating material M–1.

As best shown in Figs. 4, 5, 6 and 11 to 16, within the compartment 37, there is operatively roller mounted a carriage 47 extending longitudinally between and supported on the angle top flanges 28–1 and 29–1; and the carriage 47 is movable within the compartment 37 towards and away from the front opening 38.

At the front side of the carriage 47, improved spring hinge means 48 connect and mount a composite insulated door 49 having flanged and grooved border portions 50 which are adapted to separably interfit with the grooved and flanged door frame 46, in a usual manner.

For mounting the carriage 47 within the compartment 37, a lower track bar 51 is mounted on angle top flange 28–1 adjacent the inner edge thereof, and a lower track bar 51 is similarly mounted on the angle top flange 29–1 adjacent the inner edge thereof, the track bars 51 being parallel with each other, as are the angle top flanges 28–1 and 29–1. The track bars 51 extend substantially the entire lengths of the angle top flanges 28–1 and 29–1.

Spaced above the track bar 51 on the angle flange 28–1, there is secured on the underface of the housing top wall 33, an upper track bar 52 which is parallel with the lower track bar 51.

In a similar manner not shown, parallel with the lower track bar 51 on the angle top flange 29–1, an upper track bar 52 is secured on the underface of the housing top wall 33.

The carriage 47 includes a carriage end plate 53–1 located above the angle top flange 28–1 and below the housing top wall 33, and a carriage end plate 53–2 located above the angle top flange 29–1 and below the housing top wall 33. Between the end plates 53–1 and 53–2, a carriage back angle bar 54 extends longitudinally and has its opposite ends connected respectively with the end plates 53–1 and 53–2.

A carriage front angle bar 55 extends longitudinally between the carriage end plates 53–1 and 53–2, and the opposite ends of the carriage front angle bar 55 are connected respectively with the end plates 53–1 and 53–2.

The carriage back angle bar 54 includes a bottom flange 54–1 and a back flange 54–2. Similarly the carriage front angle bar 55 includes a top flange 55–1 and a back flange 55–2.

The bottom face of the bottom flange 54–1 is aligned with the bottom faces of the carriage end plates 53–1 and 53–2, and the back flange 54–2 extends upwardly from the bottom flange 54–1.

The top flange 55–1 of the carriage front angle bar 55 has its top face aligned with the top faces of the carriage end plates 53–1 and 53–2.

Equally spaced between the carriage end plates 53–1 and 53–2, there are provided intermediate cross plates 56 and 57, having rear ends seated on and connected with the top face of the angle bottom flange 54–1. The angle back flange 55–2 has formed therein downwardly opening notches 55–3 spaced for receiving the forward ends of the intermediate cross plates 56 and 57, the upper faces of which abut the lower face of the angle top flange 55–1. The forward ends of the intermediate cross plates 56 and 57 are connected with the angle 55. The connections of the intermediate cross plates 56 and 57 with the angles 54 and 55 are by welding, not shown.

Adjacent the inner face of the carriage end plate 53–1, and at the front end thereof, there is journalled a front and lower roller 58–1 which rolls on the track bar 51 on the angle top flange 28–1. Adjacent the inner face of the carriage end plate 53–1 and at the rear end thereof, there is journalled a back and upper roller 59–1 which rolls against the upper track bar 52 opposite the angle top flange 28–1.

Adjacent the inner face of the carriage end plate 53–2 and at the front end thereof, there is journalled a front and lower roller 58–2 which rolls on the track bar 51 on the angle top flange 29–1. Adjacent the inner face of the carriage end plate 53–2 and at the rear end thereof, there is journalled a back and upper roller 59–2 which rolls against the upper track bar opposite the angle top flange 29–1.

Carriage anti-twist guide means indicated generally by 60 are operatively interposed between the carriage 47 and the supporting angle top flanges 28–1 and 29–1. The carriage anti-twist guide means 60 includes a shaft 61 extending longitudinally in the carriage between the back and front angle bars 54 and 55, and parallel therewith. The shaft 61 passes through apertures in the intermediate cross plates 56 and 57, and through journal and thrust bearing means in the carriage end plates 53–1 and 53–2. The opposite ends of the shaft 61 extend beyond the outer faces of the end plates 53–1 and 53–2. One of the outer extensions of the shaft 61 has a pinion 62–1 secured thereon, opposite the angle top flange 28–1. The other outer extension of the shaft 61 has a pinion 62–2 secured thereon, opposite the angle top flange 29–1.

Between the track bar 51 supported on the angle top flange 28–1 and the outer corner of the angle 28, there is secured on the top face of the angle top flange 28–1, a rack bar 63–1 having upwardly protruding teeth which mesh with the teeth of the pinion 62–1.

Between the track bar 51 supported on the angle top flange 29–1 and the outer corner of the angle 29, there is secured on the top face of the angle top flange 29–1, a rack bar 63–2 having upwardly protruding teeth which mesh with the teeth of the pinion 62–2.

The improved spring hinge means 48 includes a hinge shaft 64 journalled in apertures in the forward ends of the carriage end plates 53–1 and 53–2, and in the forward ends of the intermediate cross plates 56 and 57.

The door 49 has a front plate 49–1 on which hinge straps 65–1, 65–2, and 65–3 are secured. The hinge strap 65–1 is an end hinge strap and is intermediate the carriage end plate 53–1 and the cross plate 56. The hinge strap 65–2 is an end hinge strap and is intermediate the carriage end plate 53–2 and the cross plate 57. The hinge strap 65–3 is a center hinge strap and is intermediate the cross plates 56 and 57.

On the hinging ends of the straps 65–1, 65–2, and 65–3 there are secured respectively hinge collars 66–1, 66–2, and 66–3, which are journalled on the hinge shaft 64.

Figure 11:
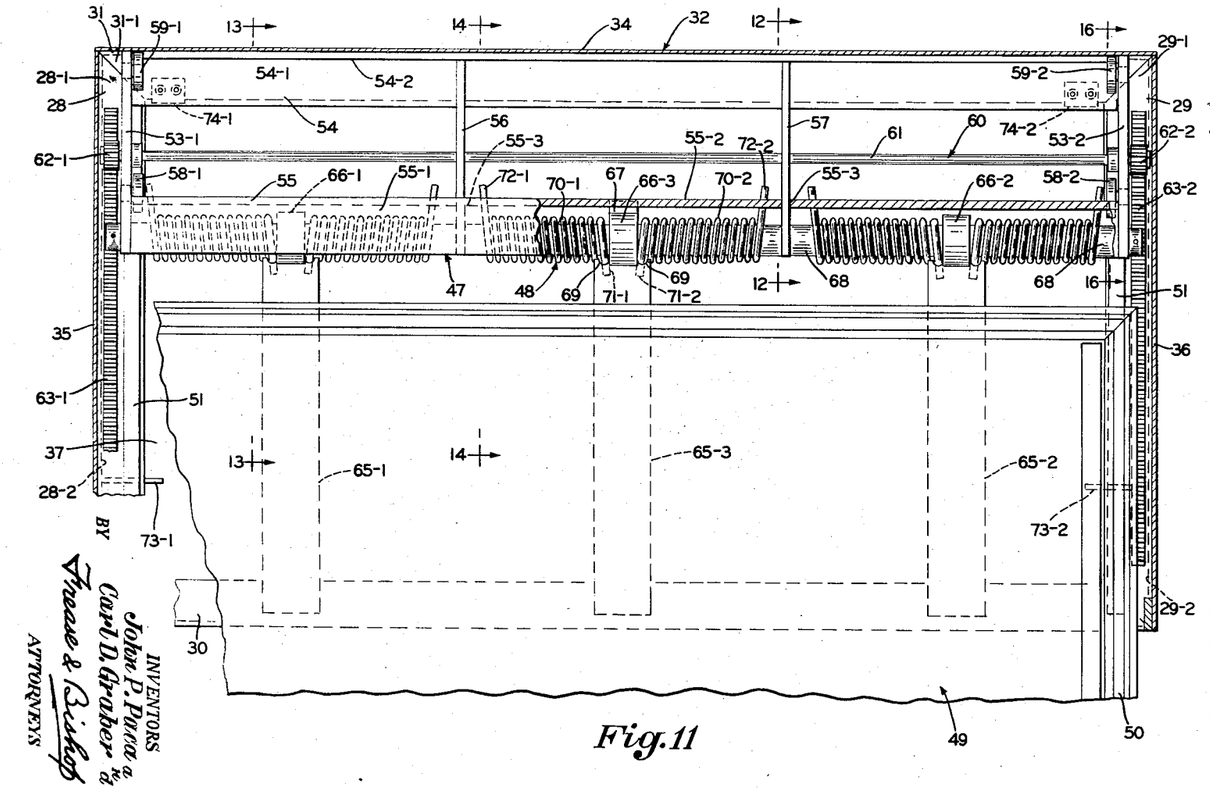
Fig. 11 is a fragmentary plan sectional view as on the plane of line 11—11, Fig. 5, looking in the direction of the arrows, and showing details of construction of the improved extendable and retractable door mounting carriage and the spring hinge means mounting of the door thereon.
Figure 12:
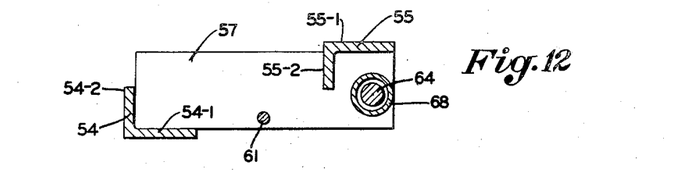
Fig. 12 is a detached vertical sectional view of the carriage, as on the plane of line 12—12, Fig. 11, looking in the direction of the arrows.
Figure 13:
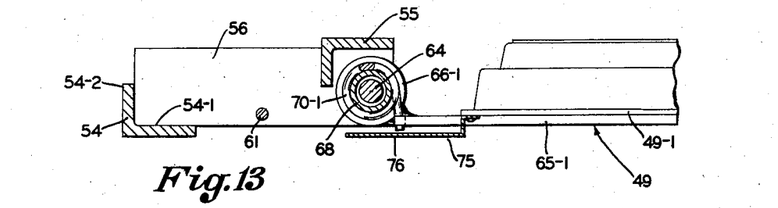
Fig. 13 is a detached fragmentary vertical sectional view of the carriage and door, as on the plane of line 13—13, Fig. 11, looking in the direction of the arrows.
Figures 14, 15:
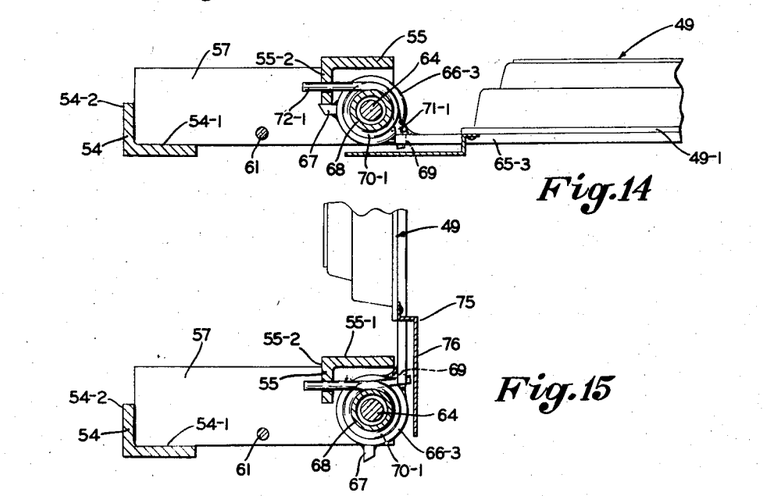
Fig. 14 is a detached fragmentary vertical sectional view of the carriage and door, as on the plane of line 14—14, Fig. 11, looking in the direction of the arrows.
Fig. 15 is a view similar to Fig. 14, and showing the door in the closed position.
Figure 16:
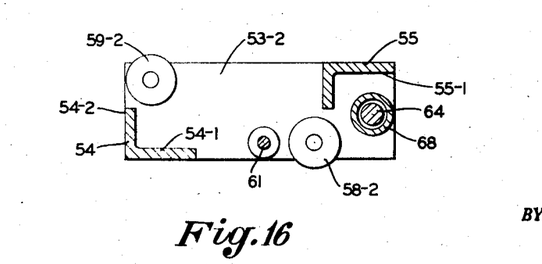
Fig. 16 is a detached vertical sectional view of the carriage as on the plane of line 16—16, Fig. 11, looking in the direction of the arrows.

The center hinge collar 66–3 has secured thereon, an arcuate stop lug 67 which is abuttable against the lower edge of the back flange 55–2 to limit the outer hinging of the door 49 on the carriage, as best shown in Figs. 11 and 14.

Spacer tubes 68 are included in the improved spring hinge means 48. The tubes 68 have their bores aligned, and the shaft 64 extends through the bores of the tubes, each tube 68 being located between one side of one of the collars 66–1, 66–2, and 66–3, and the adjacent end plate 53–1 or 53–2 or the adjacent cross plate 56 or 57.

Each of the collars 66–1, 66–2, and 66–3 has a width, respectively, less than the width of its attached strap 65–1, 65–2, and 65–3. The collars are centered with respect to their attached straps, and there is thus formed at each side of each collar a shoulder 69, which may be grooved as shown.

On each tube 68 at one side of each collar 66–1, 66–2, and 66–3, there is wound a helical spring 70–1. On the tube 68 at the other side of each collar 66–1, 66–2, and 66–3, there is wound a helical spring 70–2. As shown, each spring 70–1 has a right hand twist in its winding, and each spring 70–2 has a left hand twist. Each spring 70–1 has a tangential terminus 71–1 engaging the grooved shoulder 69 at one side of its associated collar, and at the other end each spring 70–1 has a tangential terminus 72–1 inserted through an opening in the back flange 55–2.

In a similar manner, each spring 70–2 has a tangential terminus 71–2 engaging the grooved shoulder 69 at the other side of one of the hinge collars, and at its other end each spring 70–2 has a tangential terminus 72–2 inserted through an opening in the back flange 55–2.

The improved spring hinge means 48 as thus described, constitutes means exerting a plurality of longitudinally spaced yielding counterbalancing forces on the door 49, which tend to close the door.

Stop means are provided for limiting the movement of the carriage 47 in the forward or outward direction. As shown, the stop means include an inwardly extending stop bar 73–1 extending inwardly from the angle 28, and a stop bar 73–2 extending inwardly from the angle 29. From the carriage back angle bar 54, at one end a stop flange 74–1 extends downwardly, and from the other end a stop flange 74–2 extends downwardly. The stop flange 74–1 is aligned with the stop bar 73–1, and the stop flange 74–2 is aligned with the stop bar 73–2.

Figure 4:
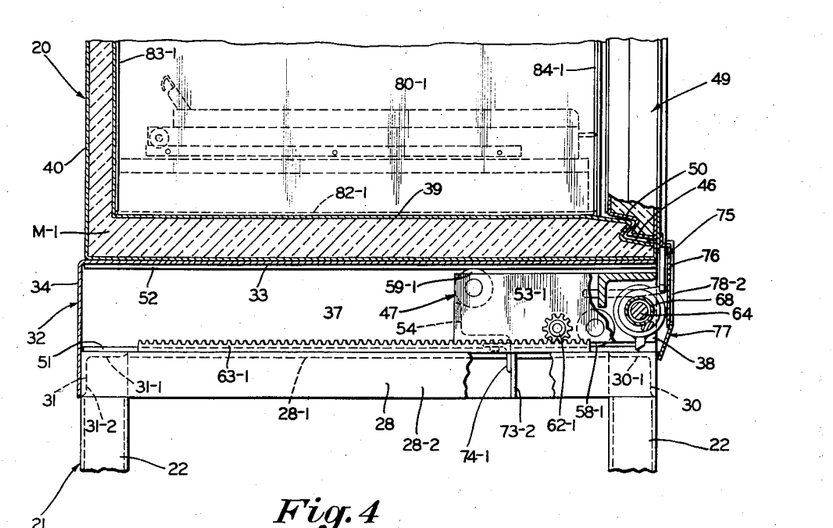
Fig. 4 is a fragmentary vertical end view looking in the direction of the arrows 4—4, Fig. 1, certain parts being broken away and shown in section.
Figure 5:
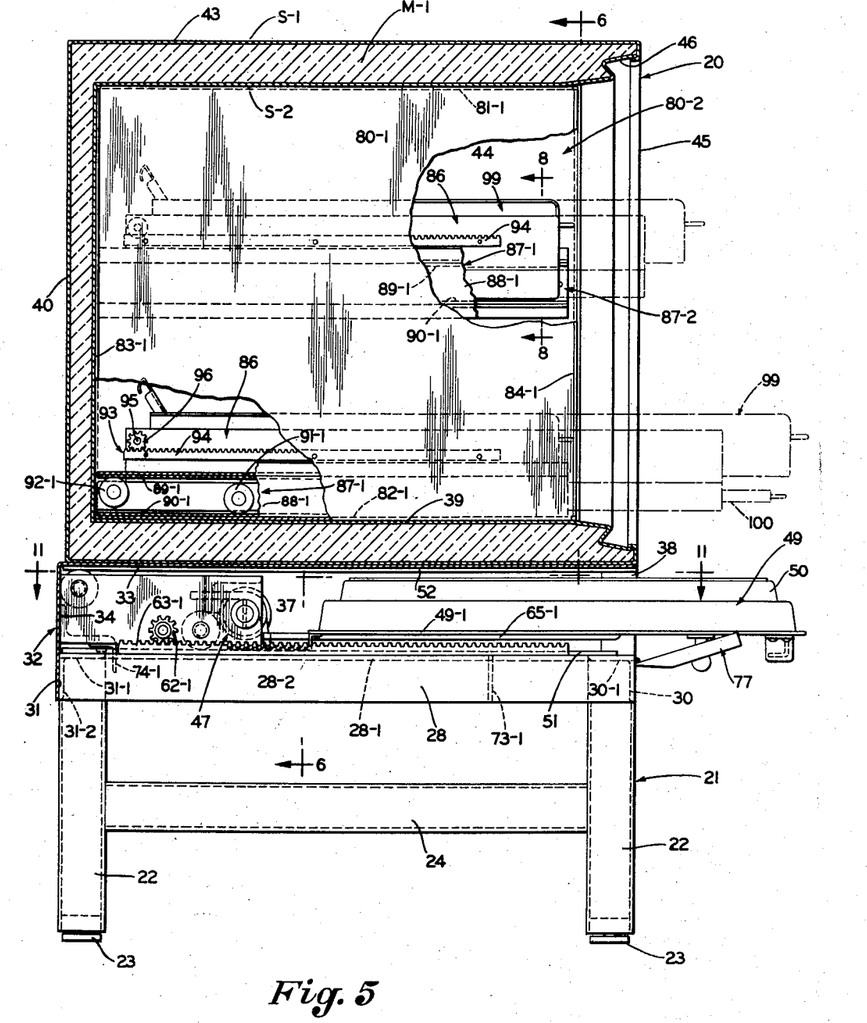
Fig. 5 is a vertical end view looking in the direction of the arrows 5—5, Fig. 2, certain parts being broken away and shown in section.

At the hinge side of the door, an angled flap 75 is connected, and includes a main panel 76 which is forwardly offset from and parallel with the front face of the door front plate 49–1. When the door is in the closed position, as best shown in Fig. 4, the main panel 76 of the angled flap 75 covers a substantial portion of the front opening 38 of the compartment 37. The remaining portions of the front opening 38 are covered by a spring hinged side notched flap 77 which has its spring hinge connected at its lower side on the front angle 30, and which includes end wings 78–1 and 78–2.

The improved insulated cabinet unit 20, as thus far described, may be used wherever there is a need for a cabinet having a spring hinged door adapted after opening to be retractable for a partial width of the door into a compartment such as the compartment 37 below a compartment such as the cabinet compartment 44.

In the construction of the improved insulated cabinet unit 20, the carriage 47 is retracted and extended without jamming by twisting, through the action of the carriage anti-twist guide means 60.

The simplified construction of the improved spring hinge means 48, as above described, permits any desired degree of counter-balancing of the door 49, whatever its weight may be, by making the springs 70–1 and 70–2 of wire having the necessary stiffness, and by varying the diameter of the tubes 68.

Figure 6:
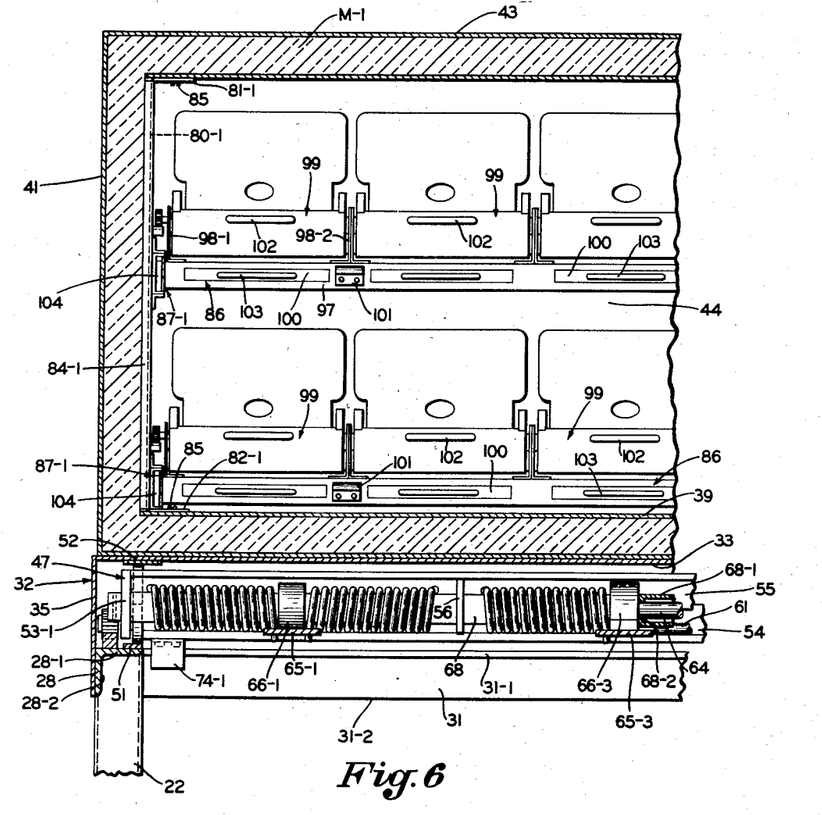
Fig. 6 is a fragmentary vertical longitudinal sectional view as on the planes of lines 6—6, Fig. 5, looking in the direction of the arrows.
Figure 7:
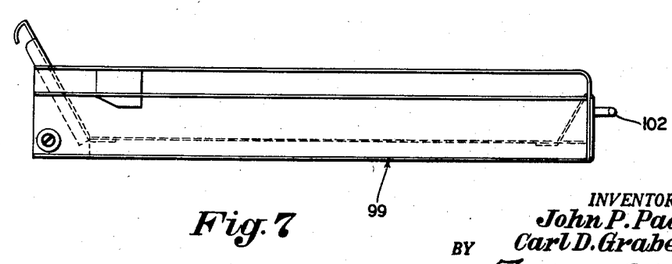
Fig. 7 is a side elevational view of one of the trays of the interior equipment removed from the cabinet.
Figure 8:
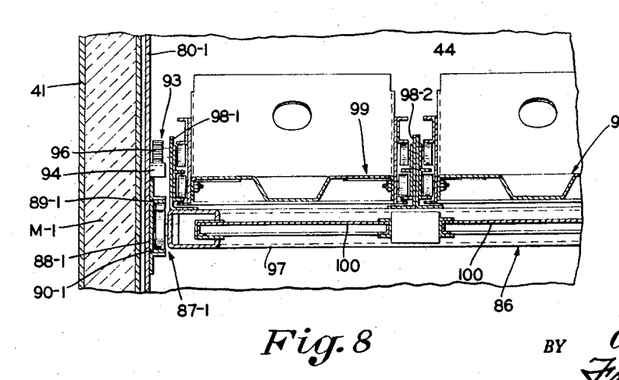
Fig. 8 is a fragmentary vertical longitudinal sectional view as on the plane of line 8—8, Fig. 5, looking in the direction of the arrows, and showing details of the mounting of the trays on the upper pan.
Figure 9:
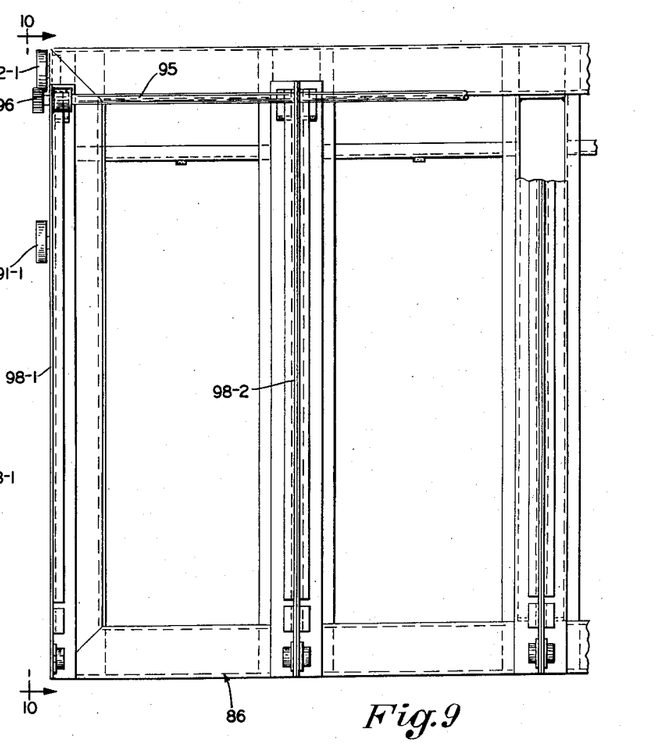
Fig. 9 is a fragmentary top plan view of one of the pans removed from the cabinet.
Figure 10:
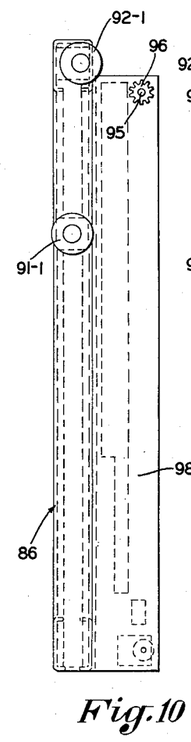
Fig. 10 is an end elevational view thereof, looking in the direction of the arrows 10—10, Fig. 9.

As shown in Fig. 6, each tube 68 includes a cylindrical body 68–1 and annular disk ends 68–2, the openings or bores of which rotatably fit on the shaft 64. The tubes 68 might otherwise have a single cylindrical wall, the bores of which rotatably fit on the shaft 64.

The improved insulated cabinet unit 20 as above described attains the desired minimum length for a unit of any specific compartment length. Variations in the height of the compartment 44, and thus the width of the door 49, are easily attained by simple variations in the springs 70–1 and 70–2, as above described.

The improved insulated cabinet unit 20, as thus far described, is particularly adapted for use as a cabinet in the compartment 44 of which the hereinafter described construction and arrangement of pans and trays are operatively mounted, and which may be broadly termed "protected interior equipment."

*Protected interior equipment*

As illustrated, in the improved insulated cabinet unit 20 the protected interior equipment operatively mounted in the cabinet compartment 44 constitutes cycle billing filing equipment, the parts of which are best shown in Figs. 2, 3, 5, 6, 7, 8, 9, and 10. The supporting and mounting means for the interior equipment are separably located and secured in the cabinet compartment 44 and include a separable end panel 80–1 having a top flange 81–1, a bottom flange 82–1, a back flange 83–1, and a front flange 84–1.

The panel 80–1 is located adjacent the inner sheet metal wall of the cabinet composite end wall 41. The panel top flange 81–1 and the panel bottom flange 82–1 extend towards the other cabinet composite end wall 42. The panel back flange 83–1 and the panel front flange 84–1 extend in the opposite direction.

Screws 85 extend through suitable apertures in the panel top flange 81–1 and in the panel bottom flange 82–1 and are screwed respectively into the inner sheet metal wall of the composite cabinet top wall 43 and the inner sheet metal wall of the composite cabinet bottom wall 39.

At the other end of the cabinet compartment 44 adjacent the inner sheet metal wall of the cabinet composite end wall 42, a separable end panel 80–2 has a construction and arrangement opposite the construction and arrangement of the separable end panel 80–1 and is similarly connected to the inner sheet metal walls of the composite cabinet top wall 43 and the composite cabinet bottom wall 39.

Two longitudinally and laterally extending pans, each indicated generally by 86 are operatively mounted for extension and retraction on the end panels 80–1 and 80–2. One of the pans 86 is adjacent the cabinet bottom wall 39, and the other pan 86 is spaced above the lower pan 86 substantially midway of the height of the compartment 44.

At one end, each pan 86 has a channel and roller pan mounting means 87–1 operative between the pan and the end panel 80–1.

At the other end, each pan 86 has a panel and roller pan mounting means indicated generally by 87–2 operative between the pan and the end panel 80–2.

The channel and roller pan mounting means 87–1 and 87–2 have oppositely arranged parts, but are otherwise identical in construction and operation.

The channel and roller pan mounting means 87–1 only, are herein described in detail, and each includes a channel 88–1 secured to the inner face of the end panel 80–1 and having a top flange 89–1 and a bottom flange 90–1 extending away from the inner face of the end panel 80–1. A front and lower roller 91–1 is journalled on the adjacent end of one of the pans 86 and a back and upper roller 92–1 is similarly journalled on the same end of the same pan 86.

The front and lower roller 91–1 rolls on the upper face of the associated channel bottom flange 90–1, and the back and upper roller 92–1 rolls against the lower face of the associated channel top flange 89–1.

Each pan 86 is provided with anti-twist guide means indicated generally by 93 and operative between the pan and the end panels 80–1 and 80–2. As shown, each antitwist pan guide means 86 includes a rack bar 94 secured on the inner face of the end panel 80–1; and a similar rack bar not shown is secured on the inner face of the end panel 80–2.

A shaft 95 extends longitudinally and is journalled at the rear of each pan 86. Adjacent each end of each pan 86, the shaft 95 has secured thereon a pinion 96, the pinion 96 adjacent the end panel 80–1 being shown. Each pinion 96 includes teeth meshing with the teeth of one of the rack bars 94.

Each anti-twist pan guide means 93 is thus similar in construction and operation with the anti-twist carriage guide means 60.

Each pan 86 includes a lower base 97 from the upper face of which extend sets of longitudinally spaced laterally extending tray mounting side walls 98–1 and 98–2.

As above described, each pan 86 is mounted for extension from and retraction into the cabinet compartment 44. Between and on each set of tray mounting side walls 98–1 and 98–2, a tray 99 of usual construction is roller mounted for extension and retraction by usual means which need not be described in detail. In each pan base 97 below each tray 99, a work shelf 100 is mounted for extension and retraction by usual slide means which need not be described in detail.

Each pan has secured on the front end of its base a pair of pan pulls 101. Each tray is provided with a handle 102. Each work shelf is provided with a pull 103.

Each channel of each channel and roller pan mounting means has located between its flanges a pan stop 104 against which the associated front and lower roller 91–1 abuts at a desired position of extension of the particular pan 86 from the cabinet compartment 44. Preferably and as best shown in Fig. 3, the lower pan 86 is extendable a greater distance beyond the front end of the cabinet unit 20 than is the upper pan 86.

Figure 1:
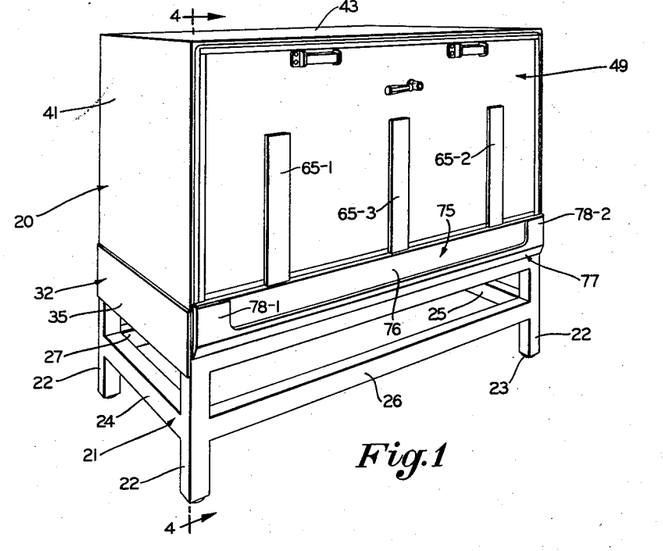
Fig. 1 is a perspective view of an insulated cabinet including one embodiment of the present improvements, and showing the horizontally hinged door in the closed position.
Figure 2:
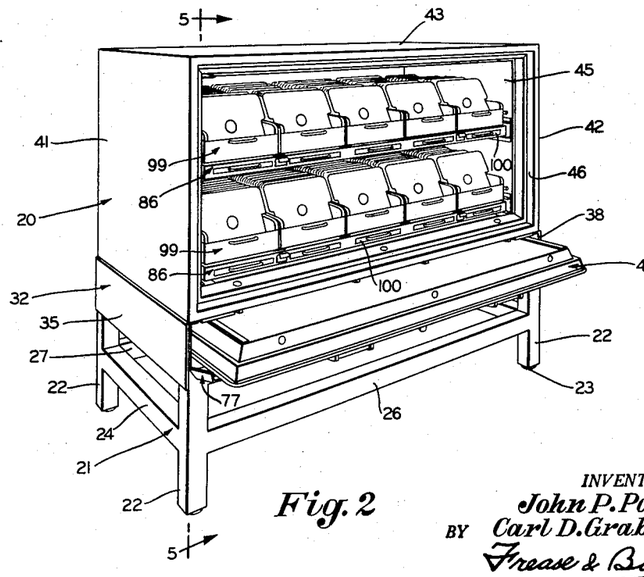
Fig. 2 is a perspective view similar to Fig. 1, and showing the door in its open position and partially retracted below the cabinet lower wall, and showing equipment in the interior compartment of the cabinet including upper and lower pans completely retracted within the compartment, and trays on each pan completely retracted within the compartment.
Figure 3:
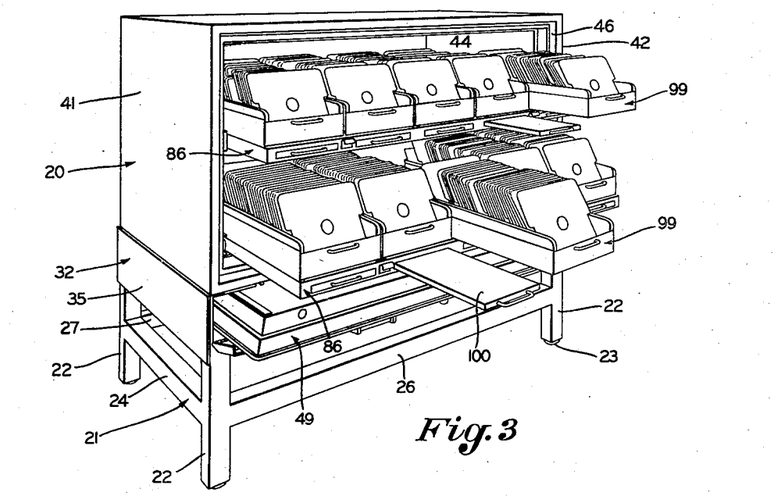
Fig. 3 is a perspective view similar to Fig. 2, and showing the upper and lower trays extended outwardly to working position beyond the front end of the cabinet door frame, the lower pan being extended a greater distance than the upper pan, and trays and work shelves on each pan being extended outwardly to working position accessible to a seated worker.

Also as shown in Fig. 3 by the above described construction and arrangement of the interior equipment of the cabinet unit 20, a single seated operator may reach and service the records contained in the several trays 99.

*Second embodiment*

Figure 17:
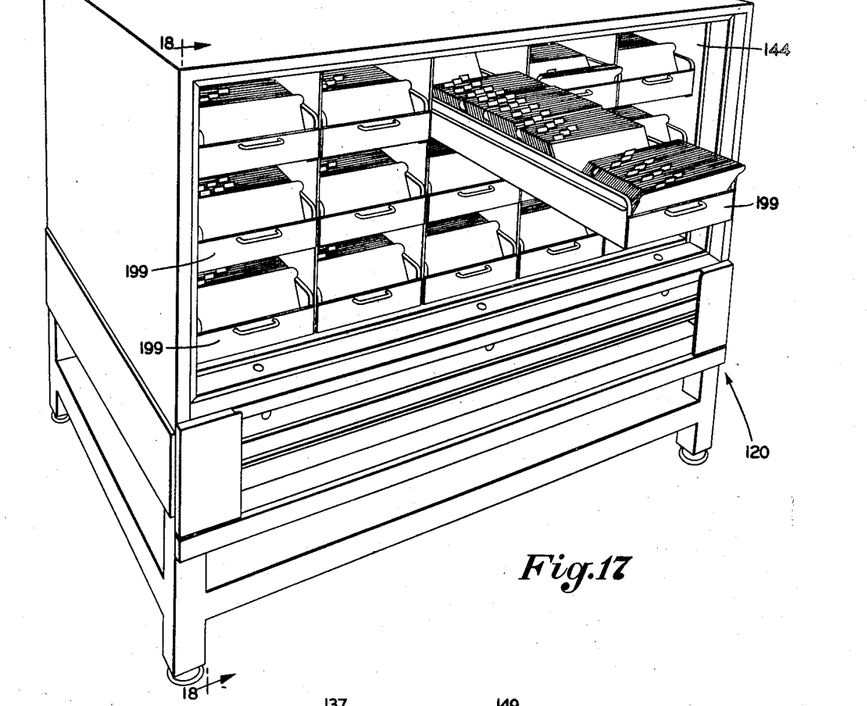
Fig. 17 is a perspective view of another insulated cabinet including a second embodiment of the present improvements, and showing the horizontally hinged door in the open and fully retracted position below the bottom wall of the cabinet.
Figure 18:
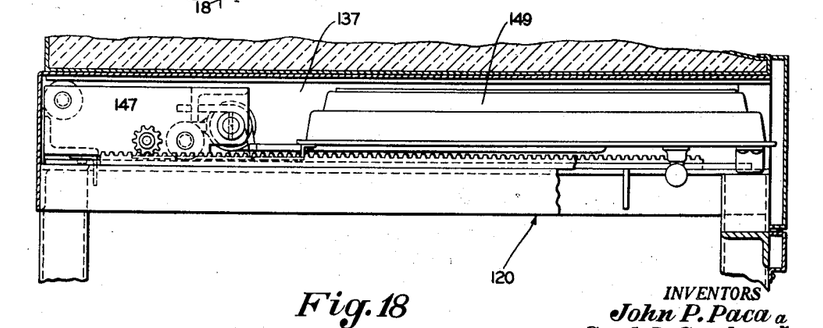
Fig. 18 is a fragmentary vertical end view looking in the direction of the arrows 18—18, Fig. 17, certain parts being broken away and shown in section.

In Figs. 17 and 18 there is illustrated another insulated cabinet unit indicated generally by 120 and including a second embodiment of the present improvements.

The cabinet unit 120 is generally similar to the cabinet unit 20 with the exception, that the carriage mounting and door receiving compartment 137 of the cabinet unit 120 is dimensioned so that when the door 149 is opened and the carriage 147 and door 149 are retracted, the door 149 is located entirely within the compartment 147.

Moreover, the interior equipment of the cabinet unit 120 is different than the interior equipment of the cabinet unit 20. The interior equipment of the cabinet unit 120 includes a plurality of trays 199 which are mounted for reciprocation into and out of the cabinet compartment 144. There are no pans or work shelves in the cabinet unit 120.

We claim:

1. A cabinet unit including top, back, end, and bottom walls forming a cabinet compartment having a front opening, a door frame engirdling the front opening and having a front plane, a carriage operatively mounted for reciprocation below the bottom wall, the carriage reciprocating from and to a front position adjacent the front plane of the door frame, a door, hinge means mounting the door on the carriage, the door being swingable when the carriage is in the front position between a closed position in the door frame and an open position below and substantially parallel with the cabinet bottom wall, the door when in open position being movable with the carriage from the front position of the carriage to a rear position in which the door is completely over-lapped by the cabinet bottom wall, helical spring means operatively interposed between the door and the carriage in association with the hinge means and applying a plurality of longitudinally spaced counter-balancing forces to the door by reacting between the door and carriage, and interior equipment separately mounted in the compartment, the interior equipment including an end plate adjacent each cabinet end wall, a plurality of pans mounted for reciprocation on the end plates, a plurality of trays mounted for reciprocation on each pan, and a plurality of shelves mounted for reciprocation on each pan below the trays.

2. A cabinet unit including top, back, end and bottom walls forming a cabinet compartment having a front opening, a door frame engirdling the front opening and having a front plane, a carriage operatively mounted for reciprocation below the bottom wall, the carriage reciprocating from and to a front position adjacent the front plane of the door frame, a door, hinge means mounting the door on the carriage, the door being swingable when the carriage is in the front position between a closed position in the door frame and an open position below and substantially parallel with the cabinet bottom wall, the door when in open position being movable with the carriage from the front position of the carriage to a rear position in which the door is completely overlapped by the cabinet bottom wall, helical spring means operatively interposed between the door and the carriage in association with the hinge means and supplying a plurality of longitudinally spaced counted-balancing forces to the door by reacting between the door and carriage, and interior equipment separably mounted in the compartment, the interior equipment including at least two pans, means mounting said two pans for reciprocation in the compartment at different levels to form at least one extendible upper pan and at least one extendible lower pan, and said means mounting said two pans being formed so that said lower pan is extendible a greater distance from the compartment front opening than the upper pan.

3. A cabinet unit as defined in claim 2, and in which a plurality of trays are mounted on each pan; in which there is means mounting said trays for reciprocation on said pans; in which a plurality of shelves are mounted on each pan below the trays; and in which there is means mounting said shelves for reciprocation on said pans.

4. A cabinet unit including top, back, end, and bottom walls forming a cabinet compartment having a front opening, a door frame engirdling the front opening and having a front plane, a carriage operatively mounted for reciprocation below the bottom wall, the carriage reciprocating from and to a front position adjacent the front plane of the door frame, a door, hinge means mounting the door on the carriage, the door being swingable when the carriage is in the front position between a closed position in the door frame and an open position below and substantially parallel with the cabinet bottom wall, the door when in open position being movable with the carriage from the front position of the carriage to a rear position in which the door is completely over-lapped by the cabinet bottom wall, helical spring means operatively interposed between the door and the carriage in association with the hinge means and applying a plurality of longitudinally spaced counter-balancing forces to the door by reacting between the door and carriage; the hinge means including longitudinally spaced laterally extending plate members on the carriage, hinge straps extending laterally from the door toward the carriage, the hinge straps being longitudinally spaced from each other and each hinge strap being located between two of the carriage plate members, a collar on each hinge strap, the plate members having formed therein openings aligned with each other, the collars having bores aligned with each other and with the plate openings, and a shaft extending through the aligned bores and openings; and the spring means including a helical spring reacting between each hinge strap and the carriage.

5. A cabinet unit including top, back, end, and bottom walls forming a cabinet compartment having a front opening, a door frame engirdling the front opening and having a front plane, a carriage operatively mounted for reciprocation below the bottom wall, the carriage reciprocating from and to a front position adjacent the front plane of the door frame, a door, hinge means mounting the door on the carriage, the door being swingable when the carriage is in the front position between a closed position in the door frame and an open position below and substantially parallel with the cabinet bottom wall, the door when in open position being movable with the carriage from the front position of the carriage to a rear position in which the door is completely over-lapped by the cabinet bottom wall, helical spring means operatively interposed between the door and the carriage in association with the hinge means and applying a plurality of longitudinally spaced counter-balancing forces to the door by reacting between the door and carriage; hinge means including longitudinally spaced laterally extending plate members on the carriage, hinge straps extending laterally from the door toward the carriage, the hinge straps being longitudinally spaced from each other and each hinge strap being located between two of the carriage plate members, a collar on each hinge strap, the plate members having formed therein openings aligned with each other, the collars having bores aligned with each other and with plate openings, a spacer tube located between one side face of each collar and the opposite side face of one of the plate members, the spacer tube having bores aligned with each other, and a shaft extending through the aligned bores and openings; and the spring means including a helical spring wound around each spacer tube, each spring having a terminal, and one terminal reacting against the door and one terminal reacting against the carriage.

References Cited in the file of this patent

UNITED STATES PATENTS

| | | |
|---|---|---|
| 198,982 | Howell | Jan. 8, 1878 |
| 308,537 | Walsh | Nov. 25, 1884 |
| 688,750 | Stake | Dec. 10, 1901 |
| 1,062,976 | Jackson | May 27, 1913 |
| 1,735,717 | Antrim | Nov. 12, 1929 |
| 1,876,192 | Wolters | Sept. 6, 1932 |
| 1,922,487 | Meilink | Aug. 15, 1933 |
| 1,993,477 | Gourley et al. | Mar. 5, 1935 |
| 2,109,689 | Clark et al. | Mar. 1, 1938 |
| 2,238,004 | Wolters | Apr. 8, 1941 |

FOREIGN PATENTS

| | | |
|---|---|---|
| 3,937 | Great Britain | Oct. 24, 1877 |